United States Patent
Ahn et al.

(10) Patent No.: US 11,261,856 B2
(45) Date of Patent: Mar. 1, 2022

(54) LINEAR COMPRESSOR

(71) Applicant: LG Electronics Inc., Seoul (KR)

(72) Inventors: Kwangwoon Ahn, Seoul (KR); Donghan Kim, Seoul (KR); Kiwon Noh, Seoul (KR); Joonsung Park, Seoul (KR)

(73) Assignee: LG Electronics Inc., Seoul (KR)

( * ) Notice: Subject to any disclaimer, the term of this patent is extended or adjusted under 35 U.S.C. 154(b) by 160 days.

(21) Appl. No.: 16/414,114

(22) Filed: May 16, 2019

(65) Prior Publication Data

US 2019/0353155 A1 Nov. 21, 2019

(30) Foreign Application Priority Data

May 16, 2018 (KR) .......................... 10-2018-0056138

(51) Int. Cl.
*F04B 39/16* (2006.01)
*F04B 35/04* (2006.01)
(Continued)

(52) U.S. Cl.
CPC .............. *F04B 39/16* (2013.01); *F04B 35/04* (2013.01); *F04B 39/02* (2013.01); *F04B 39/126* (2013.01);
(Continued)

(58) Field of Classification Search
CPC ........ F04B 39/16; F04B 39/126; F04B 39/02; F04B 35/04; F16C 32/0618; F16C 33/1005
See application file for complete search history.

(56) References Cited

U.S. PATENT DOCUMENTS 6,901,845 B2 * 6/2005 Kiikka .................. F02G 1/0435
                                                                         384/7
2008/0008610 A1 * 1/2008 Muth .................. F04B 39/0005
                                                                         417/416
(Continued)

FOREIGN PATENT DOCUMENTS

CN 101512154 8/2009
CN 104454445 3/2015
(Continued)

OTHER PUBLICATIONS

Chinese Office Action in Chinese Application No. 201910401795.X, dated Sep. 14, 2020, 15 pages (with English translation).
(Continued)

*Primary Examiner* — Devon C Kramer
*Assistant Examiner* — David N Brandt
(74) *Attorney, Agent, or Firm* — Fish & Richardson P.C.

(57) ABSTRACT

Provided is a linear compressor including a linear motor having a mover reciprocating with respect to a stator; a piston coupled to the mover to reciprocate; a cylinder into which the piston is slidingly inserted, the cylinder having an inner circumferential surface forming a bearing surface together with an external circumferential surface of the piston, the cylinder forming a compression space together with the piston, and the cylinder having at least one first hole formed through the inner circumferential surface of the cylinder and an outer circumferential surface of the cylinder to guide refrigerant discharged from the compression space to the bearing surface; and a porous member inserted into the outer circumferential surface of the cylinder and configured to cover the first hole, the porous member having multiple micropores smaller than the first hole.

20 Claims, 9 Drawing Sheets

(51) Int. Cl.
 *F04B 39/02*   (2006.01)
 *F04B 39/12*   (2006.01)
 *F16C 33/10*   (2006.01)
 *F04B 53/18*   (2006.01)
 *F04B 53/20*   (2006.01)
 *F16C 32/06*   (2006.01)

(52) U.S. Cl.
 CPC ............ *F16C 33/105* (2013.01); *F04B 53/18* (2013.01); *F04B 53/20* (2013.01); *F16C 32/0618* (2013.01); *F16C 32/0633* (2013.01); *F16C 32/0644* (2013.01); *F16C 33/1005* (2013.01); *Y10S 92/02* (2013.01)

(56) References Cited

U.S. PATENT DOCUMENTS

| | | |
|---|---|---|
| 2009/0238701 A1 | 9/2009 | Giacchi et al. |
| 2010/0218548 A1 | 9/2010 | Giacchi et al. |
| 2014/0283679 A1 | 9/2014 | Muhle et al. |
| 2015/0226203 A1* | 8/2015 | Hahn .................. F04B 39/0005 417/415 |
| 2016/0017883 A1* | 1/2016 | Noh ...................... F04B 35/045 417/437 |

FOREIGN PATENT DOCUMENTS

| | | |
|---|---|---|
| CN | 105317651 | 2/2016 |
| CN | 107339224 | 11/2017 |
| GB | 1536118 | 12/1978 |
| KR | 20150040027 | 4/2015 |
| KR | 20160024217 | 3/2016 |
| WO | WO2014121361 | 8/2014 |

OTHER PUBLICATIONS

Extended European Search Report in European Application No. 19174564.5, dated Sep. 11, 2019, 7 pages.

EP Extended European Search Report in European Appln. No. 21157132.8, dated Apr. 20, 2021, 4 pages.

* cited by examiner

LINEAR COMPRESSOR

CROSS-REFERENCE TO RELATED APPLICATION

Pursuant to 35 U.S.C. § 119(a), this application claims the benefit of earlier filing date and right of priority to Korean Application No. 10-2018-0056138, filed on May 16, 2018, the contents of which is incorporated by reference herein in its entirety.

BACKGROUND OF THE INVENTION

1. Field of the Invention

The present invention relates to a linear compressor capable of lubricating a space between a cylinder and a piston with refrigerant.

2. Background of the Invention

As reciprocating compressors, a crank-type reciprocating compressor capable of compressing refrigerant by converting a rotational force of a rotary motor into a linear motion and a vibration-type reciprocating compressor capable of compressing refrigerant by using a linear motor performing a linear reciprocating motion are well known. A vibration-type reciprocating compressor is called a linear compressor, and such a linear compressor has no mechanical loss caused by conversion of a rotational motion into a linear reciprocating motion, thereby improving efficiency and simplifying a structure.

Meanwhile, a linear compressor may be classified into an oil-lubricated linear compressor and a gas-lubricated linear compressor according to a lubrication scheme. An oil-lubricated linear compressor has a certain amount of oil stored in a casing and is configured to lubricate a space between a cylinder and a piston by using the oil, as disclosed in patent document 1 (Korean Patent Publication NO. KR10-2015-0040027). On the other hand, a gas-lubricated linear compressor has no oil stored in a casing and is configured to lubricate a space between a cylinder and a piston by guiding a portion of refrigerant discharged from a compression space to a bearing surface between the cylinder and the piston to support the piston with a gaseous force of the refrigerant.

An oil-lubricated linear compressor (hereinafter referred to as an oil-lubricated compressor) may restrain a cylinder and a piston from being overheated due to motor heat, compression heat, or the like because oil with a relatively low temperature is supplied to a bearing surface between the cylinder and the piston. Thus, an oil-lubricated compressor may restrain refrigerant passing through a suction flow path of a piston from increasing from being suctioned into a compression chamber and heated, and thus it is possible to suppress an increase in specific volume and thus to prevent occurrence of a suction loss.

However, an oil-lubricated compressor may experience that oil is insufficient in a casing of the compressor when oil discharged to a refrigerating cycle apparatus along with refrigerant is not smoothly withdrawn to the compressor, and the oil shortage in the casing may cause the reliability of the compressor to be reduced.

On the other hand, compared to an oil-lubricated compressor, a gas-lubricated linear compressor (hereinafter referred to as a gas-lubricated compressor) may be downsized, and has no reduction in reliability due to oil shortage because a bearing surface between a cylinder and a piston is lubricated with refrigerant.

In such a gas-lubricated compressor, a loss of compressed refrigerant may occur because a small amount of refrigerant is injected into a bearing surface between a cylinder and a piston to support the piston by a gaseous force of the refrigerant. That is, the refrigerant flowing to the bearing surface between the bearing surface between the cylinder and piston leaks into an inner space of a casing due to a difference in pressure. Thus, the consumption flow rate of the compressed refrigerant increases, and the loss occurs. Accordingly, in order to reduce the consumption flow rate of the refrigerant, it is possible to consider a method of decreasing the diameter of a nozzle part of a gas bearing or decreasing the number of nozzle parts.

However, a conventional gas-lubricated compressor has an increased manufacturing cost for a cylinder because, as described above, a plurality of nozzle parts are finely formed in a cylinder but this requires a complicated post-operation as well as a considerable difficulty in forming the fine nozzle parts.

Also, a conventional gas-lubricated compressor may have reduced reliability because, when the inner diameter of a nozzle part is made very small or the number of nozzle parts is reduced in consideration of the consumption flow rate of the refrigerant, the possibility that the nozzle part is clogged by foreign substances increases.

Also, a conventional gas-lubricated compressor may have a decreased load-bearing capacity for a piston because a pressure loss of refrigerant passing through a nozzle part may occur when the inner diameter of the nozzle part is made small. As a result, fractional loss or abrasion may occur between a cylinder and a piston.

Also, a conventional gas-lubricated compressor has nozzle parts formed lengthwise of the cylinder in a plurality of rows, but a refrigerant passage for guiding refrigerant to the nozzle parts may be biased to some of the nozzle parts in the plurality of rows. Thus, more refrigerant flows into the nozzle parts close to the refrigerant passage such that the load-bearing capacity for the piston may be non-uniformly formed lengthwise.

Also, when a refrigerant passage for guiding refrigerant to nozzle parts is biased some of the nozzle parts in a plurality of rows, as described above, a conventional gas-lubricated compressor may have an increased suction loss because the refrigerant excessively flows into a compression space or may have an increased compression loss because the refrigerant leaks into an inner space of a casing. That is, when the refrigerant passage is formed close to a nozzle part adjacent to the compression space, the refrigerant passing through the nozzle part flows into the compression space, thus increasing the suction loss. On the other hand, when the refrigerant passage is formed close to a nozzle part farther from the compression space, the amount of refrigerant leaking into the inner space of the casing may increase, thus increasing the compression loss.

Also, a conventional gas-lubricated compressor may have an increased pressure loss because the space between a frame and a cylinder is not tightly sealed such that refrigerant leaks into an inner space of a casing before flowing into a nozzle part.

Also, a conventional gas-lubricated compressor has a filter installed outside a gas bearing and at a suction side or a discharge side with respect to the gas bearing to filter out foreign substances because the foreign substances flow to the gas bearing together with refrigerant. However, as a result, the number of components of the compressor is increased, which causes an increase in manufacturing cost.

RELATED ART DOCUMENT

Patent Document (Patent Document 1) Korean Patent Publication NO. KR10-2015-0040027A (published on Apr. 14, 2015)
(Patent Document 2) Korean Patent Publication NO. KR10-2016-0024217A (published on Mar. 4, 2016)

SUMMARY OF THE INVENTION

Therefore, an aspect of the detailed description is to provide a linear compressor capable of smoothly supplying refrigerant to a bearing surface between a cylinder and a piston without a fine nozzle part formed in the cylinder.

Also, the present invention provides a linear compressor capable of preventing a flow path for guiding refrigerant to a bearing surface from being clogged by foreign substances and also restraining the refrigerant from excessively flowing to the bearing surface, thereby reducing a consumption flow rate of the refrigerant.

Also, the present invention provides a linear compressor capable of preventing refrigerant flowing to a bearing surface from being excessively decompressed to secure an appropriate load-bearing capacity for a piston.

Also, the present invention provides a linear compressor capable of allowing refrigerant flowing to the bearing surface to secure a uniform load-bearing capacity lengthwise with respect to a piston.

Also, the present invention provides a linear compressor capable of restraining refrigerant flowing to a bearing surface from flowing into a compression space or from leaking into an inner space of a casing, thereby reducing a suction loss or a compression loss.

Also, the present invention provides a linear compressor capable of restraining refrigerant from leaking into an inner space of a casing before flowing to a bearing surface, thereby reducing a compression loss.

Also, the present invention provides a linear compressor capable of suppressing an increase in outer diameter even though a separate filter member is provided between a frame and a cylinder.

Also, the present invention provides a linear compressor capable of eliminating a filter for restraining foreign substances from flowing to a bearing surface along with refrigerant to decrease the number of components, thereby simplifying a structure and also reducing a manufacturing cost.

To achieve these and other advantages and in accordance with the purpose of this specification, as embodied and broadly described herein, there is provided a linear compressor for supplying compressed refrigerant to a bearing surface between a cylinder and a piston and supporting the piston against the cylinder by a gaseous force of the refrigerant, the linear compressor including a porous member having micropores in the middle of a refrigerant passage through which the compressed refrigerant is supplied to the bearing surface between the cylinder and the piston, wherein gas holes larger than the micropores are formed inside and outside the porous member.

Here, the gas hole inside the porous member and the gas hole outside the porous member may be formed at radially different locations.

Also, the gas holes inside the porous member and the gas hole outside the porous member may be located at a constant distance.

Also, the compressed refrigerant may move to the gas hole provided outside the porous member through one refrigerant passage.

In order to achieve the objectives of the present invention, there is also provided a linear compressor including. a linear motor that comprises a stator and a mover configured to reciprocate with respect to the stator; a piston coupled to the mover and configured to move based on reciprocation of the mover; a cylinder that accommodates the piston and that defines a compression space together with the piston, the cylinder defining at least one first hole that extends from an inner circumferential surface of the cylinder to an outer circumferential surface of the cylinder and that is configured to guide refrigerant discharged from the compression space to a bearing surface defined between the inner circumferential surface of the cylinder and an outer surface of the piston; and a porous member located at the outer circumferential surface of the cylinder and configured to cover the at least one first hole, the porous member defining micropores having a diameter smaller than a diameter of the at least one first hole.

Here, a cover member that surrounds the porous member and that is located at an outer circumferential surface of the porous member, the cover member defining at least one second hole that is in communication with the micropores of the porous member and that extends from an outer circumferential surface of the cover member to an inner circumferential surface of the cover member, a diameter of the at least one second hole is greater than the diameter of the micropores.

Also, a frame that surrounds the cover member and that is located at the outer circumferential surface of the cover member, the frame defining at least one refrigerant passage configured to guide refrigerant discharged from the compression space to the at least one second hole of the cover member.

Also, a sealing member located at each of a first end of the porous member and a second end of the porous member.

Also, the cover member surrounds the sealing member and is configured to restrict movement of the sealing member. Also, the cylinder defines an annular recess configured to receive the sealing member and to restrict movement of the sealing member in the annular recess.

Also, the inner circumferential surface of the cover member is in contact with the outer circumferential surface of the porous member, and the outer circumferential surface of the cover member is in contact with an inner circumferential surface of the frame. Here, the piston is configured to move between a front side of the cylinder and a rear side of the cylinder opposite to the front side, a volume of the compression space being decreasing based on the piston moving from the rear side toward the front side, the at least one first hole comprises a plurality of first holes, the plurality of first holes comprising a plurality of front holes defined at the front side of the cylinder and a plurality of rear holes defined at the rear side of the cylinder, and the at least one second hole is located at a position between the plurality of first holes.

Here, the plurality of front holes are arranged along a lengthwise direction of the cylinder, the plurality of rear holes are arranged along the lengthwise direction of the cylinder, and the at least one second hole is located at a position circumferentially between the plurality of front holes and circumferentially between the plurality of rear holes.

Also, the at least one second hole is located at a position spaced apart by a same distance from each of the plurality of first holes.

In order to achieve the objectives of the present invention, there is also provided a linear compressor including a casing; a linear motor located in an inner space of the casing, the linear motor comprising a stator and a mover configured to reciprocate with respect to the stator; a cylinder that is located inside the linear motor and that defines a compression space, the cylinder defining a first hole that extends from an outer circumferential surface of the cylinder to an inner circumferential surface of the cylinder; a piston located inside the cylinder and configured to reciprocate relative to the cylinder based on movement of the mover, the piston being configured to compress refrigerant in the compression space; a discharge valve configured to open and close at least a portion of the compression space; a discharge cover that accommodates the discharge valve, the discharge cover defining a discharge space configured to receive refrigerant discharged from the compression space; a frame located in the inner space of the casing and configured to support the cylinder; a porous filter membrane that is located between the outer circumferential surface of the cylinder and an inner circumferential surface of the frame, the porous filter membrane defining micropores having a diameter smaller than a first diameter of the first hole; and a shrink tube that surrounds the porous filter membrane and that is located at an outer circumferential surface of the porous filter membrane, the shrink tube defining a second hole having a second diameter larger than the diameter of the micropores, the frame defines a refrigerant passage that allows communication between the discharge space and the second hole and that is configured to guide refrigerant discharged from the compression space to the second hole of the shrink tube.

Here, the first hole comprises a plurality of first holes that are arranged along a lengthwise direction of the cylinder, the second hole is located between the plurality of first holes in the lengthwise direction of the cylinder, and the plurality of first holes are arranged about the second hole.

Also, each of the plurality of first holes is located at a position spaced apart by a same distance from the second hole. A sealing member located at least one of both lengthwise sides of the porous filter membrane, the shrink tube surrounds the sealing member and is configured to provide sealing of an end of the porous filter membrane.

Also, the outer circumferential surface of the porous filter membrane is in contact with an inner circumferential surface of the shrink tube, and the inner circumferential surface of the frame is in contact with an outer circumferential surface of the shrink tube.

In order to achieve the objectives of the present invention, there is also provided a linear compressor including a casing; a cylinder that is located inside the casing and that defines a compression space configured to receive refrigerant, the cylinder defining a cylinder hole that extends from an outer circumferential surface of the cylinder to an inner circumferential surface of the cylinder; a piston located inside the cylinder and configured to reciprocate relative to the cylinder, the piston being configured to compress refrigerant received in the compression space; a porous filter membrane that is located at the outer circumferential surface of the cylinder, the porous filter membrane having micropores configured to communicate with the cylinder hole; and a refrigerant passage that extends from an outside of the cylinder and that is configured to guide refrigerant discharged from the compression space to an outer surface of the piston through the micropores and the cylinder hole.

A shrink tube that surrounds an outer circumferential surface of the porous filter membrane, the shrink tube defining a tube hole that is positioned offset from the cylinder hole in a circumferential direction of the cylinder and in a longitudinal direction of the cylinder.

Also, the cylinder hole comprises a plurality of cylinder holes, and the tube hole comprises a plurality of tube holes, and wherein the plurality of cylinder holes and the plurality of tube holes are alternately arranged along a longitudinal direction of the cylinder.

Also, the plurality of cylinder holes comprise: a plurality of first cylinder holes arranged along a first circumference of the cylinder at a first longitudinal position of the cylinder; a plurality of second cylinder holes arranged along a second circumference of the cylinder at a second longitudinal position of the cylinder, the second longitudinal position being spaced apart from the first longitudinal position in the longitudinal direction of the cylinder, and the plurality of tube holes are arranged along a tube circumference corresponding to a third circumference of the cylinder between the first longitudinal position and the second longitudinal position.

Also, each of the plurality of tube holes are configured to receive refrigerant from the refrigerant passage and supply the received refrigerant to the plurality of cylinder holes through the micropores in the circumferential direction of the cylinder and in the longitudinal direction of the cylinder.

Advantageous Effects of the Invention

With the linear compressor according to the present invention, refrigerant can be easily supplied to a bearing surface between a cylinder and a piston at an appropriate pressure and in an appropriate amount without a fine nozzle part formed in the cylinder, and thus it is possible to easily manufacture the cylinder and also to reduce a manufacturing cost for the cylinder accordingly.

Also, with the linear compressor according to the present invention, a porous filter membrane having micropores is inserted into and coupled to an external circumferential surface of a cylinder, instead of a refrigerant passage of a gas bearing being widened and formed in the cylinder, and thus it is possible to appropriately decompress refrigerant supplied to a bearing surface, thereby reducing the amount of refrigerant leaking into a compression space or an inner space of a casing. Thus, it is possible to increase a substantial load-bearing capacity for a piston.

Also, not only is the refrigerant passage widened, but also the refrigerant can be filtered through the micropores of the porous filter membrane to remove foreign substances. Thus, it is possible to prevent the gas bearing from being clogged by the foreign substances.

Also, with the linear compressor according to the present invention, a porous filter membrane is installed on an outer circumferential surface of a cylinder, and also a sealing member is installed on both sides of the porous filter membrane. Thus, it is possible to restrain refrigerant flowing to the porous filter membrane from leaking into an inner space of a casing through both ends of the porous filter membrane instead of flowing to a bearing surface. As a result, it is possible to reduce consumption of the refrigerant moving from the compression space toward the bearing surface, thereby decreasing a compression loss and also increasing compression efficiency.

Also, with the linear compressor according to the present invention, gas holes wider than micropores are formed inside and outside a porous filter membrane, and the inner gas hole is placed at the same distance from the outer gas holes. Thus, it is possible to allow the flow distribution of the refrigerant flowing to the bearing surface to be uniform. As a result, this may allow refrigerant flowing to the bearing surface to uniformly support the piston in the lengthwise direction, thereby reducing abrasion or friction loss between the cylinder and the piston.

In addition, it is possible to restrain refrigerant flowing to the bearing surface from flowing into a compression space or from leaking into an inner space of a casing, thereby reducing a suction loss or a compression loss and thus increasing compression efficiency.

Also, with the linear compressor according to the present invention, gas holes wider than micropores are formed inside and outside a porous filter membrane, and the outer gas hole are placed in the middle lengthwise with respect to the inner gas hole. Thus, it is possible to supply refrigerant to both lengthwise sides of the bearing surface. Accordingly, it is possible to restrain the refrigerant from excessively flowing into a compression space or an inner space of a casing, thereby reducing consumption of the refrigerant and also uniformly maintaining a load-bearing capacity for the piston.

Also, with the linear compressor according to the present invention, a cylinder, a porous filter membrane, a shrink tube, and a frame are placed as closely as possible. Thus, it is possible to suppress an increase in outer diameter even though a separate filter member is provided between the frame and the cylinder and also to increase a sealing force for refrigerant.

Also, with the linear compressor according to the present invention, foreign substances can be cut off in the middle of a gas bearing by using a member with micropores to eliminate filters installed on front and rear sides of the gas bearing and thus reduce the number of components. As a result, it is possible to simplify the structure of the compressor and lower a manufacturing cost thereof.

BRIEF DESCRIPTION OF THE DRAWINGS

FIG. 6 shows a sectional view of the cylinder taken at a location where a second gas hole is formed according to this embodiment, and FIG. 7 shows a sectional view of the cylinder taken at a location where a first gas hole is formed according to this embodiment.

DETAILED DESCRIPTION OF THE INVENTION

Hereinafter, a linear compressor and a refrigerator having the same according to the present invention will be described in detail with reference to embodiments shown in the accompanying drawings.

The linear compressor according to the present invention performs an operation of suctioning and compressing fluid and discharging the compressed fluid. The linear compressor according to the present invention may be an element of a refrigeration cycle. Hereinafter, a fluid will be described below by taking a refrigerant circulating in the refrigeration cycle as an example.

Figure 1:
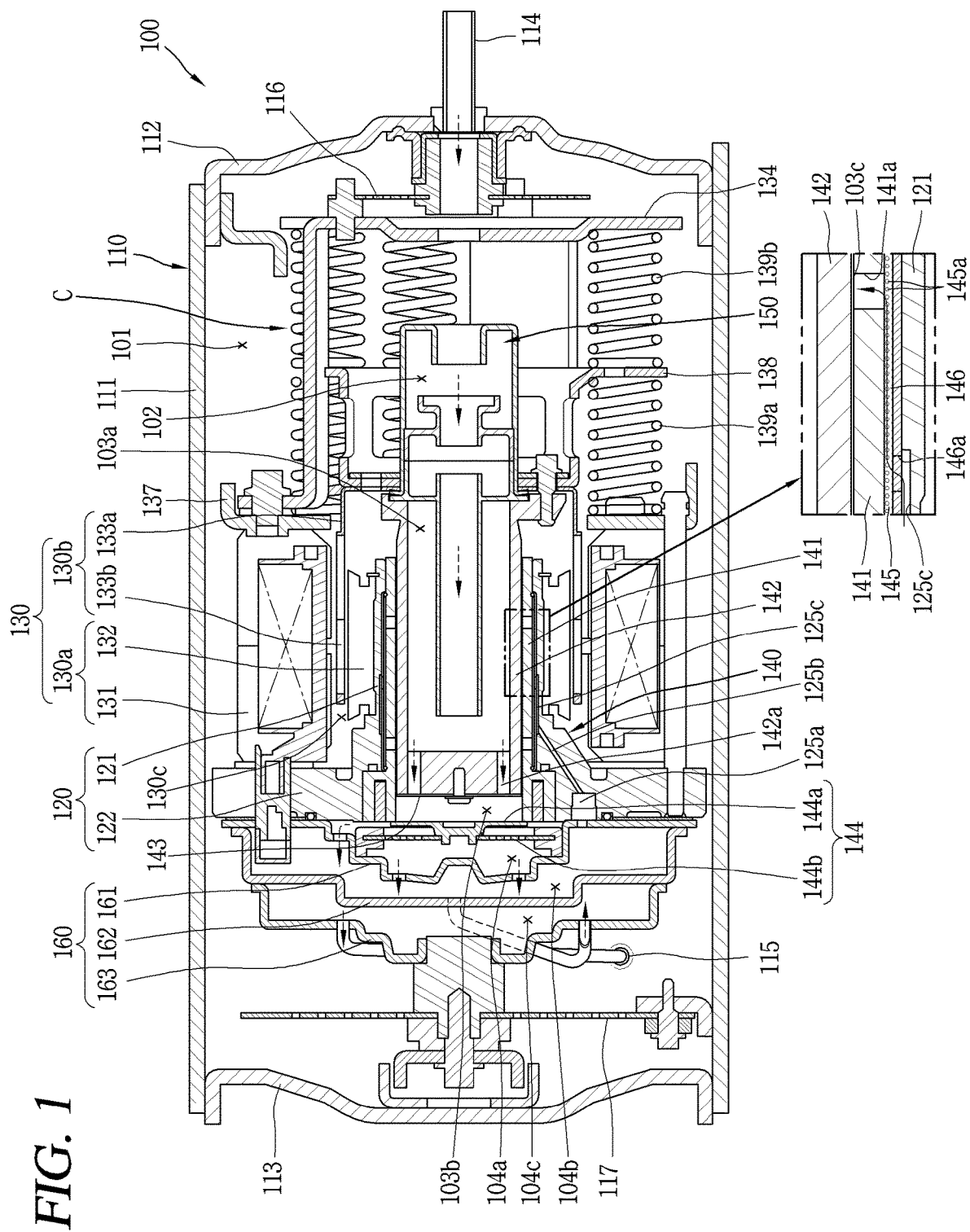
FIG. 1 is a longitudinal sectional view showing a linear compressor according to the present invention.

Referring to FIG. 1, a linear compressor 100 according to this embodiment may include a casing 110 having an inner space 101 forming a sealed space and a frame 120 elastically supported by support sprints 116 and 117, which will be described below, in the inner space 101 of the casing 110. A linear motor 130 (hereinafter used interchangeably with the actuation unit) may be coupled to and supported by the frame 120, and a compression unit 140 for suctioning, compressing, and discharging refrigerant may be coupled to the linear motor 130. Thus, the compression unit 140 may be coupled to the frame 120 along with the linear motor 130 and thus may be elastically supported against the casing 110.

A shell 111 may have an inner diameter variously formed depending on the side of the linear motor 130. However, the linear compressor 100 according to this embodiment is not required to be filled with oil in the inner space 101 of the casing 110 because an oil bearing is excluded and a gas bearing is employed. Accordingly, preferably, the inner diameter of the shell 111 may be made as small as possible, for example, to a degree that a flange part 122 of the frame 120, which will be described later, will not come into contact with an inner circumferential surface of the casing 110. Thus, an outer diameter of the shell 111 of the linear compressor 100 according to this embodiment may be made much smaller than that in the above-described Patent Document 1.

The frame 120, which is a portion of a main body C of the compressor, is provided inside the casing 110. Also, a motor assembly composed of the linear motor 130 and a cylinder 141 of the compression unit 140 may be coupled to or supported by the frame 120. Thus, the frame 120 may be elastically supported against the casing 110 by a first support spring 116 and a second support spring 117, along with the linear motor 130 and the compression unit 140.

Here, the frame 120 may include a body part 121 formed in a cylindrical shape and a flange part 122 extending radially at a front end of the body part 121.

An inner stator 132, which will be described later, may be coupled to an outer circumferential surface of the body part 121, and the cylinder 141 may be coupled to an inner circumferential surface of the body part 121. However, a porous filter membrane and a shrink tube, which will be described later, are coupled to an outer circumferential surface of the cylinder according to this embodiment, and thus an outer circumferential surface of a shrink tub may be in contact with or in close proximity to the inner circumferential surface of the body. This will be described below again, along with the gas bearing.

An outer stator 131, which will be described later, may be coupled to a rear surface of the flange part 122, and a discharge cover assembly 160, which will be described later, may be coupled to a front surface of the flange part 122.

Also, on one side of a front surface of the flange part 122, a bearing entrance recess 125a forming a portion of the gas bearing, which will be described later, may be formed, and a bearing communication hole 125b passing from the bearing entrance recess 125a to the inner circumferential surface of the body part 121 may be formed. A bearing communication recess 125c for enabling the bearing communication hole 125b to communicate with a second gas hole 146a, which will be described later, may be formed on the inner circumferential surface of the body part 121.

The bearing entrance recess 125a is axially recessed by a predetermined depth. The bearing communication hole 125b is a hole with a smaller cross-sectional area than that of the bearing entrance recess 125a and may be inclined toward the inner circumferential surface of the body part 121. Also, the bearing communication recess 125c may be formed on the inner circumferential surface of the body part 121 in an annular shape having a predetermined depth and axial length. However, the bearing communication recess 125c may include an annular recess connected to the bearing communication hole 125b and a plurality of elongated recesses may be connected to the annular recess to extend lengthwise and communicate with a second gas hole, which will be described later.

Meanwhile, the linear motor 130 may include a stator 130a and a mover 130b reciprocating with respect to the stator 130a.

The stator 130a may include an outer stator 131 fastened to the flange part 122 of the frame 120 and an inner stator 132 spaced a predetermined gap 130c from an inner side of the outer stator 131. The inner stator 132 may be inserted into and coupled to the outer circumferential surface of the body part 121 to surround the body part 121 of the frame 120.

The mover 130b may include a magnet holder 133a and a magnet 133b supported by the magnet holder 133a. A spring supporter 138 is coupled to a second end of the magnet holder 133a along with the piston 142, and a first resonance spring 139a and a second resonance spring 139b for resonating the mover 130b of the linear motor 130 and the piston 142 of the compression unit 140 may be provided on both sides of the spring supporter 138.

The compression unit 140 may include the cylinder 141, the piston 142, a suction valve 143, and a discharge valve assembly 144.

The cylinder 141 may be formed in a cylindrical shape to have a compression space 103b therein may be inserted into or fastened to the inner circumferential surface of the frame 120. A suction muffler assembly 150, which will be described later, in which refrigerant is suctioned into the compression space 103b may be provided on a rear side of the cylinder 141, and a discharge cover assembly 160, which will be described later, in which refrigerant compressed in the compression space 103b is discharged may be provided on a front side of the cylinder 141.

Also, the remaining portion of the gas bearing for supplying discharged gas to a bearing space or bearing surface 103c (hereinafter collectively referred to as a bearing surface) between the cylinder 141 and the piston 142 to lubricate a space between the cylinder 141 and the piston with the gas may be formed in the cylinder 141. For example, a first gas hole 141a passing through the outer circumferential surface and the inner circumferential surface may be formed in a region of the cylinder 141 for communicating with the bearing communication recess 125c. The first gas hole 141a serves to guide compressed refrigerant flowing into the bearing communication recess 125c to the bearing surface 103c formed between the inner circumferential surface of the cylinder 141 and the outer circumferential surface of the piston 142.

The first gas hole 141a may be formed on only a side adjacent to the compression space 103b (hereinafter referred to as a front side) with respect to an axial center of the cylinder and may also be formed on a rear side, which is opposite to the front side, in consideration of the degree of the piston 142 The first gas hole 141a will be described below again together with the porous filter membrane, the shrink tube, etc. of the gas bearing.

The piston 142 may have a suction flow path 103a therein and may be formed in a cylindrical shape having an partially open front end and a fully open rear end. Also, the rear end, which is an open end as described above, is connected to the magnet holder 133a so that the piston 142 may reciprocate together with the magnet holder 133a.

Also, a suction port 142a for communication between the suction flow path 103a and the compression space 103b may be formed at the front end of the piston 142, and a suction valve 143 for selectively opening or closing the suction port 142a may be provided at the front end of the piston 142. Thus, refrigerant suctioned into the inner space 101 of the casing 110 may be suctioned into the compression space 103b in the cylinder 141 through the suction flow path 103a and the suction port 142a of the piston 142 when the suction valve 143 is opened.

The discharge valve assembly 144 for opening and closing the compression space 103b may be detachably provided at the front end of the cylinder 141, and a discharge cover assembly 160 for attenuating noise generated while refrigerant is being discharged from a discharge space may be coupled onto the front surface of the frame 120. The discharge valve assembly 144 may be accommodated inside the discharge cover assembly 160.

The discharge cover assembly 160 may be composed of a single discharge cover or a plurality of discharge cover arranged to sequentially communicate with one another.

For example, when there are three discharge covers, a discharge space (hereinafter referred to a first discharge space) 104a of a discharge cover (hereinafter referred to as a first cover) 161 coupled to the frame 120 may communicate with a discharge cover (hereinafter referred to as a second discharge space) 104b of a second discharge cover (hereinafter referred to as a second cover) 162 coupled to a front side of the first cover 161, and the second discharge space 104b may communicate with a discharge space (hereinafter referred to as a third discharge space) 104c of a third discharge cover (hereinafter referred to as a third cover) 163 coupled to a front side of the second cover 162.

Here, the bearing entrance recess 125a, which has been described above, may be accommodated inside the second discharge space 104b. Thus, refrigerant flowing into the bearing entrance recess 125a is not refrigerant that is discharged from the compression space 103b and directly flows into the first discharge space 104a, but refrigerant that moves to the second discharge space 104b via the first discharge space 104a and flows into the second discharge space 104b. Thus, it is possible to reduce temperature of refrigerant flowing to the bearing surface 103c between the cylinder 141 and the piston 142.

In the drawing, reference numeral 102 denotes a noise space, reference numerals 112 and 113 denote a rear cap and a front cap, reference numerals 114 and 115 denote a suction pipe and a discharge pipe, reference numerals 134 and 137 denote a back cover and a stator cover, and reference numerals 144a and 144b denote a discharge valve and a valve spring.

The linear compressor according to this embodiment operates as follows.

That is, when electric current is applied to a coil 135b of the linear motor 130, a magnetic flux is formed between the outer stator 131 and the inner stator 132. This magnetic flux causes the mover 130b composed of the magnet holder 133a and the magnet 133b to linearly reciprocate in the gap between the outer stator 131 and the inner stator 132.

Then, the piston 142 connected to the magnet holder 133a linearly reciprocates in the cylinder 141, thus increasing or decreasing the volume of the compression space 103b. In this case, when the piston 142 moves backward to increase d the volume of the compression space 103b, the suction valve 143 is opened to suction refrigerant of the suction flow path 103a into the compression space 103b. On the other hand, when the piston 142 moves forward to decrease the volume of the compression space 103b, the piston 142 compresses refrigerant in the compression space 103b. The compressed refrigerant is discharged into the first discharge space 104a while opening the discharge valve 144a.

Figure 2:
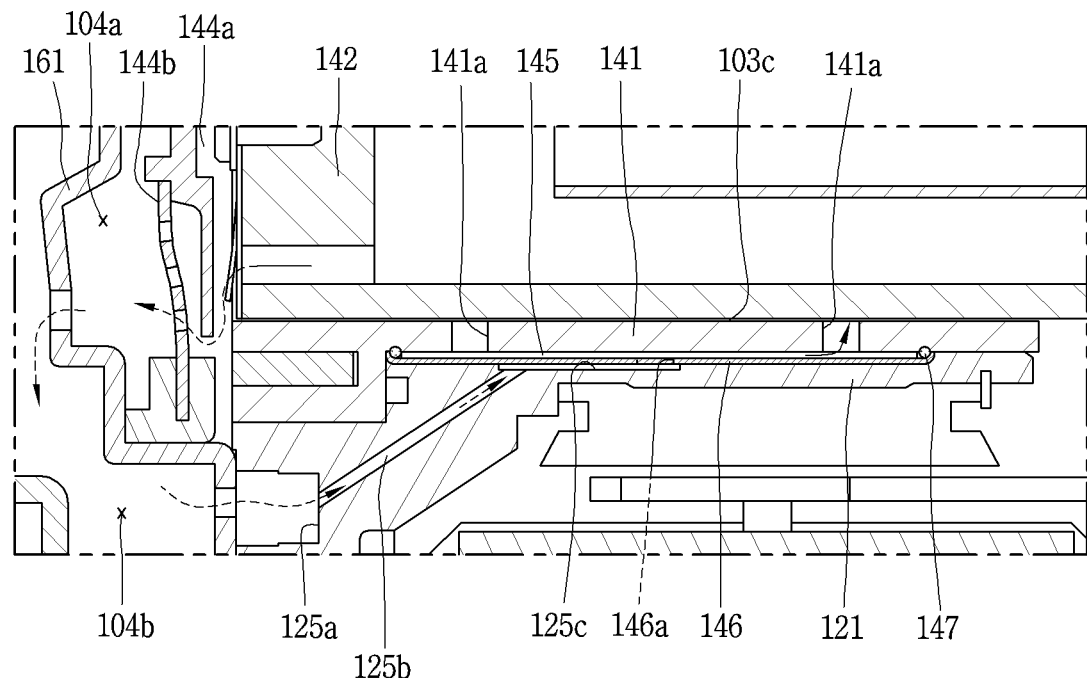
FIG. 2 is an enlarged sectional view of a portion of an actuation unit in the linear compressor shown in FIG. 1

Then, the refrigerant discharged into the first discharge space 104a moves to the second discharge space 104b through the first communication hole 105a and then moves to the third discharge space 104c through the second communication hole 105b, a connection pipe 106, and the third communication hole 105c. In this case, as shown in FIG. 2, a portion of the refrigerant moving from the first discharge space 104a to the second discharge space 104b flows into the bearing entrance recess 125a forming the entrance of the gas bearing. This refrigerant flows into the bearing communication recess 125c through the bearing communication hole 125b and then is supplied to the bearing surface 103c between the inner circumferential surface of the cylinder 141 and the outer circumferential surface of the piston 142 through a second gas hole 146a of the shrink tube 146, a micropore 145a of the porous filter membrane 145, and a first gas hole 141a of the cylinder 141, which will be described later. The high-pressure refrigerant supplied to the bearing surface 103c lubricates the space between the cylinder 141 and the piston 142. Then, some of the refrigerant flows out to the compression space, and the other flows out through a suction space. The series of courses are repeated.

In this case, when a passage of the gas bearing has a too large inner diameter, the flow rate of the refrigerant flowing to the bearing surface 103c between the cylinder 141 and the piston 142 is excessively increased and thus a large amount of refrigerant flows into the compression space 103b or leaks into the inner space 101 of the casing 110. Thus, it is possible to reduce compressor efficiency.

On the other hand, when the passage of the gas bearing has a too small inner diameter, the passage of the gas bearing is clogged by foreign substances or the pressure of the refrigerant flowing between the cylinder 141 and the piston 142 becomes so low that the load-bearing capacity for the piston 142 is lowered. This causes abrasion or friction loss between the cylinder 141 and the piston 142, thus reducing compressor efficiency.

Therefore, in a compressor with a gas bearing, it would be advantageous in terms of compressor efficiency and reliability to supply a proper amount of refrigerant to the bearing surface without clogging the gas bearing.

In view of the above description, the gas bearing of the linear compressor according to the present invention has a member for expanding the area of the passage of the gas bearing, the member having a micropore in the middle of the passage. Thus it is possible to reduce the consumption flow rate of the refrigerant supplied to the bearing surface between the cylinder and the piston and also increase the substantial load-bearing capacity for the piston.

Figure 3:
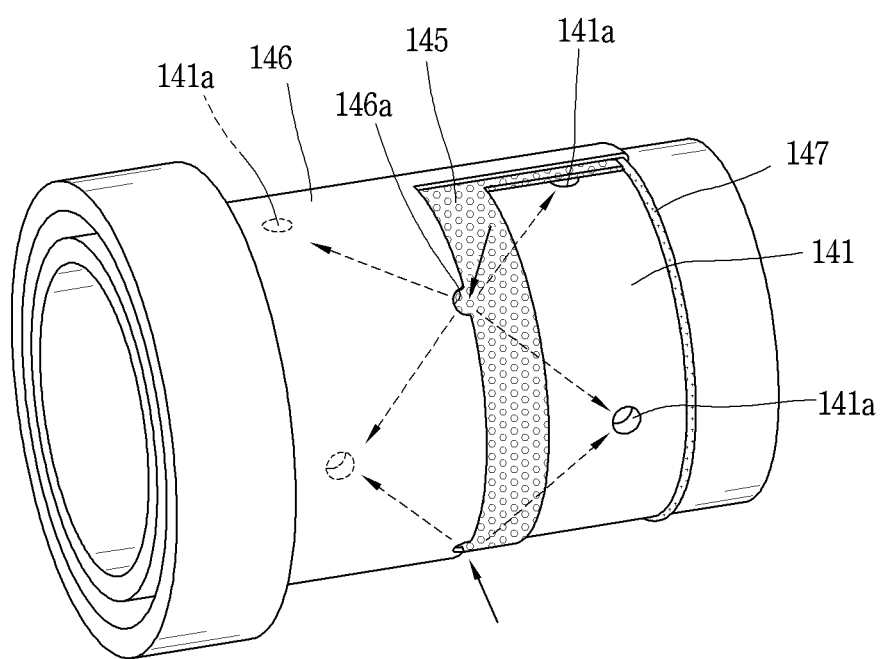
FIG. 3 is a perspective view of the linear compressor according to the present invention in which a portion of a gas bearing coupled to a cylinder is cut out.
Figure 4:
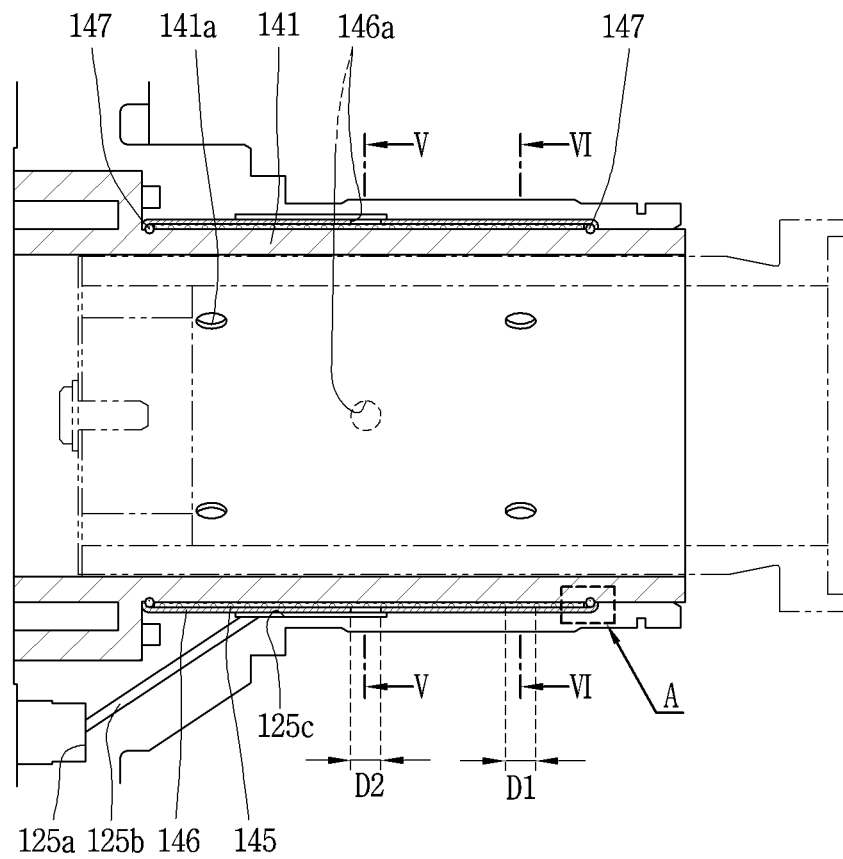
FIG. 4 is a sectional view showing the inside of the cylinder containing the gas bearing in FIG. 3.

FIG. 3 is a perspective view of the linear compressor according to the present invention in which a portion of a gas bearing coupled to a cylinder is cut out, and FIG. 4 is a sectional view showing the inside of the cylinder containing the gas bearing in FIG. 3.

As shown, a plurality of first gas holes 141a may be formed in the cylinder 141. A porous filter membrane 145 that covers the first gas holes 141a and has multiple micropores 145a is inserted into and coupled to the outer circumferential surface of the cylinder 141. A second gas hole 146a that covers the micropore 145a of the porous filter membrane 145 and forms the passage of the gas bearing at a predetermined position may be formed on an outer circumferential surface of the porous filter membrane 145.

For example, the plurality of first gas holes 141a, which have been described above, may be circumferentially formed in the cylinder 141 at regular intervals. The first gas holes 141a may pass through the outer circumferential surface and the inner circumferential surface of the cylinder 141 and may have the same inner diameter D1. The inner diameter D1 of the first gas holes 141a may be the same as the inner diameter of the bearing communication hole 125b or may be about 4 mm to 6 mm much larger than a general nozzle diameter of 20 μm to 30 μm.

Thus, it is possible to significantly eliminate the possibility that the first gas holes 141a are clogged due to fine foreign substances. However, when the inner diameter of the first gas holes 141a is enlarged as described above, the refrigerant may excessively flow to the bearing surface. However, this inflow may be suppressed by the porous filter membrane 145 inserted into the outer circumferential surface of the cylinder 141 to cover the first gas holes 141a.

That is, the porous filter membrane 145 may have multiple micropores 145a formed therein. The micropores 145a may have a diameter or cross-sectional area significantly smaller than the inner diameter D1 of the first gas holes 141a. The diameter or cross-sectional area of the micropores 145a may be approximately similar to or greater than a conventional nozzle diameter. When the micropore 145a has a diameter similar to or greater than the conventional nozzle diameter, the micropore 145a may be clogged by foreign substances or may be reduced in pressure drop by half. However, the porous filter membrane 145 itself is composed of a large number of micropores 145a. Thus, the micropores 145a, which are passages of the porous filter membrane 145, may not be completely clogged, and a path through which the refrigerant moves may be elongated to sufficiently decompress the refrigerant.

Thus, the refrigerant is sufficiently decompressed while passing through the porous filter membrane 145 and then flows into the first gas holes 141a. Therefore, it is possible to suppress the pressure of the refrigerant from rising above a necessary pressure even though the inner diameter D1 of the first gas hole 141a is large. However, even in this case, the traveling distance of refrigerant passing through the micropore 145a of the porous filter membrane 145 may differ depending on the locations of the first gas holes 141a. As a result, the pressure of the refrigerant flowing through in the first gas holes 141a may be uneven. However, this unevenness may be suppressed by the shrink tube 146 that surrounds the outer circumferential surface of the porous filter membrane 145 and has the second gas hole 146*a* provided at a predetermined location. The inner diameter D2 of the second gas hole may be approximately the same as the inner diameter D1 of the first gas hole. However, since the second gas hole 146*a* serves as a kind of refrigerant passage, the inner diameter of the second gas hole 146*a* is not necessarily the same as the inner diameter of the first gas hole 141*a*.

That is, the outer circumferential surface of the porous filter membrane 145 is surrounded by the shrink tube 146 to restrict the refrigerant from flowing to the porous filter membrane 145 in a disorderly fashion. However, by forming the second gas hole 146*a* passing from the outer circumferential surface to the inner circumferential surface at an appropriate location of the shrink tube 146, the refrigerant that has reached the above-described bearing communication recess 125*c* may be allowed to flow to the porous filter membrane 145 only through the second gas hole 146*a*. In this case, the shrink tube 146 is used as a cover member. Accordingly, it is preferable that the shrink tube 146 is brought in close contact with the outer circumferential surface of the porous filter membrane 145 because it is possible not only to increase the sealing effect on the micropores 145*a* but also to prevent the outer diameter of the compressor from being increased.

In addition, by the shrink tube 146 formed to surround both ends of the porous filter membrane 145, it is possible to suppress a leakage of refrigerant from the porous filter membrane 145. In this case, however, the shrink tube 146 may not be able to secure sufficient sealing force.

Figure 5:
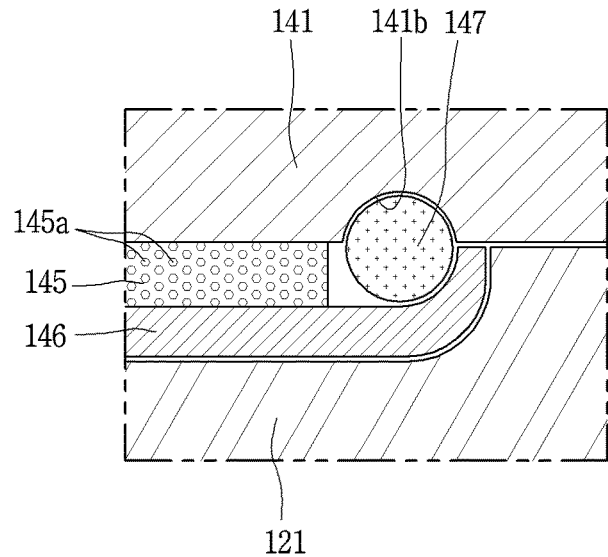
FIG. 5 is an enlarged sectional view of part "A" of FIG. 4.

In view of this, as shown in FIGS. 4 and 5, a sealing member 147 such as an O-ring may be provided at both ends or at least one end of the porous filter membrane 145. The sealing member 147 may be inserted into a sealing recess 141*b* provided on the outer circumferential surface of the cylinder 141. In this state, the sealing member 147 may be shrunk by both ends of the shrink tube 146 surrounding the sealing member 147. Thus, the porous filter membrane 145 is completely sealed by the shrink tube 146 and the sealing member, so that the refrigerant flowing into the second gas hole 146*a* can move only to the first gas hole 141*a* through the porous filter membrane 145.

Figure 6:
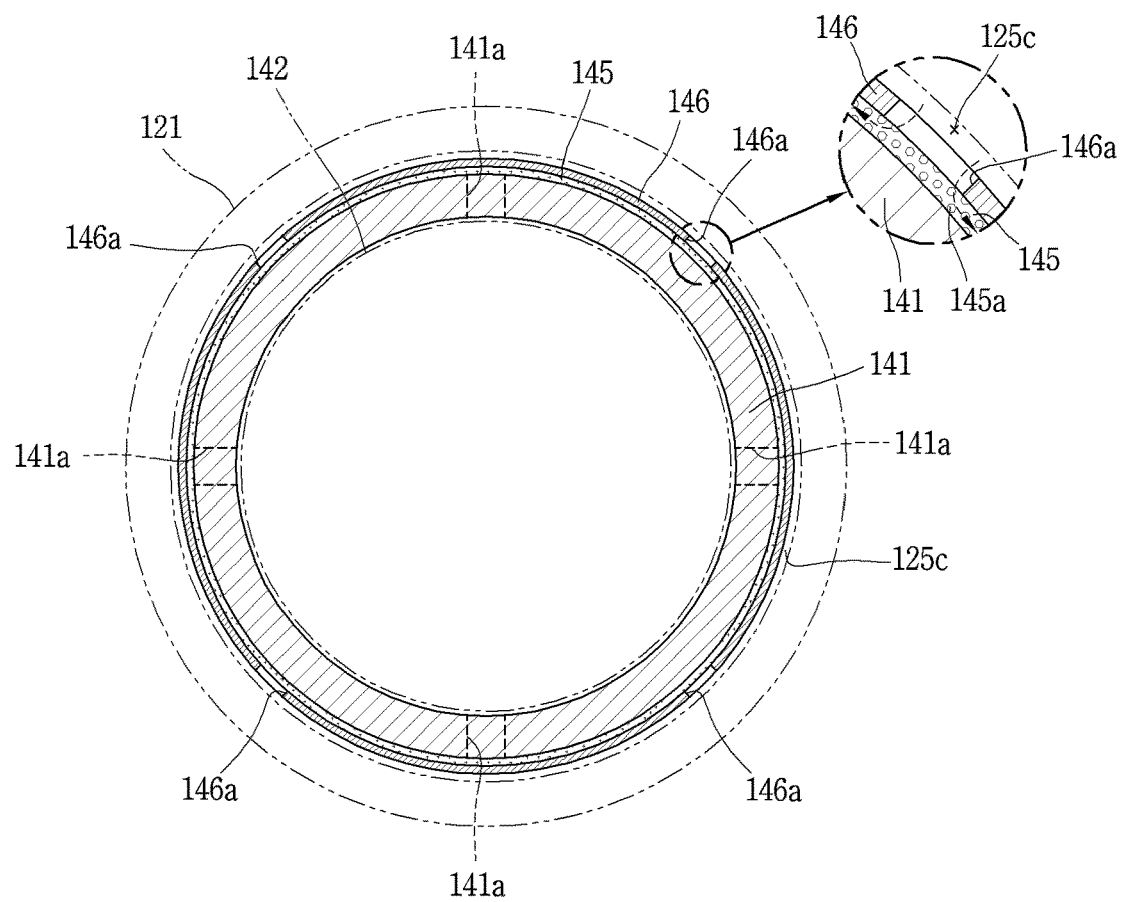
FIGS. 6 and 7 are a sectional view taken along line "V-V" and a sectional view taken along line "VI-VI" of FIG. 4.

Preferably, the first gas hole and the second gas hole are located as far from each other as possible because the refrigerant can pass through the porous filter membrane for a long time. To this end, it is preferable that the first gas holes 141*a* and the second gas holes 146*a* are circumferentially spaced at predetermined intervals from one another. FIG. 6 is a sectional view of the cylinder taken at a location where a second gas hole is formed according to this embodiment, and FIG. 7 shows a sectional view of the cylinder taken at a location where a first gas hole is formed according to this embodiment.

Figure 7:
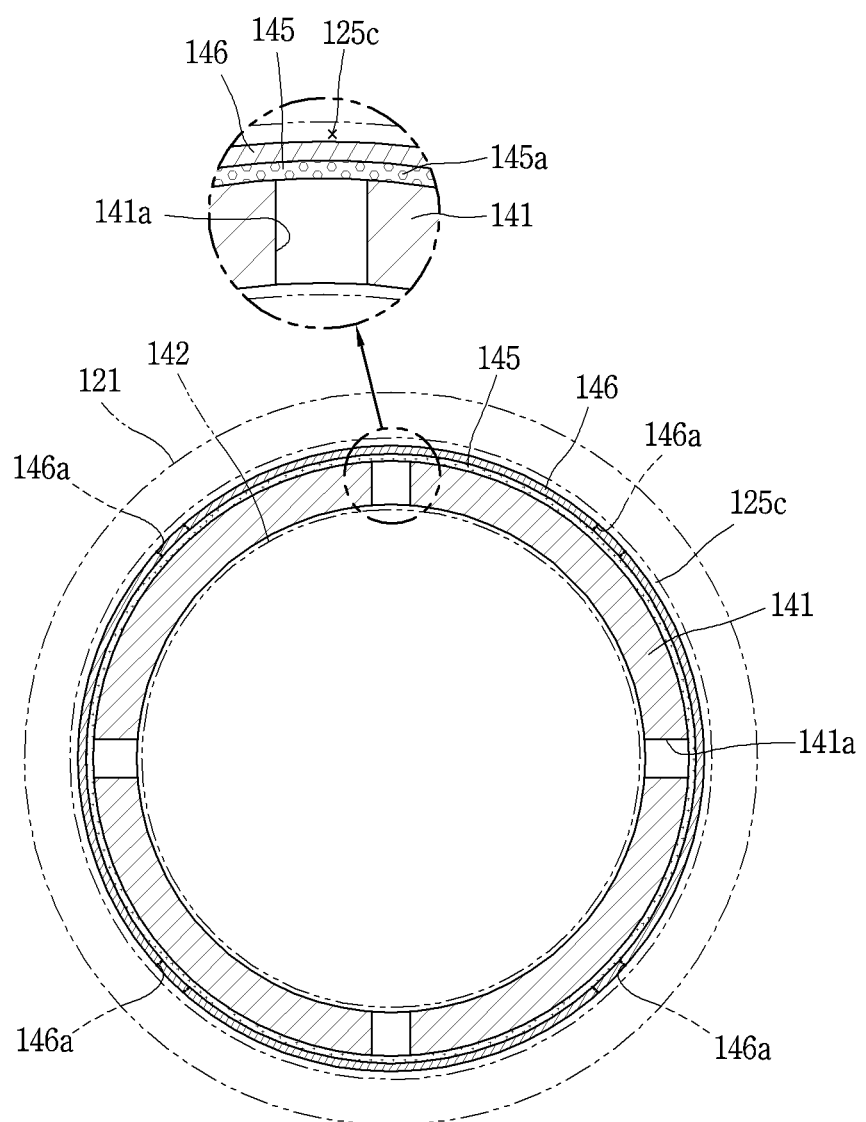

As shown in FIGS. 6 and 7, it is preferable that when such first gas holes 141*a* are vertically and horizontally formed, the second gas hole 146*a* is circumferentially formed between the first gas holes 141*a*.

Then, when the refrigerant passing through the second gas hole 146*a* circumferentially (diagonally in an actual case) moves toward the first gas holes 141*a*, the refrigerant passes through the porous filter membrane 145. In this case, the distance through which the refrigerant passes through the porous filter membrane 145 increases, and thus it is possible to improve the decompressing effect and the filtration effect.

Preferably, the first gas holes 141*a* are located at a front side and a rear side with respect to the lengthwise direction of the cylinder 141 while the second gas hole 146*a* is located in the middle between the front side and the rear side with respect to the lengthwise direction of the cylinder 141 such that the second gas hole 146*a* is located between the first gas holes 141*a*. Here, the front side may be defined as a direction in which the piston 142 moves to decrease the volume of the compression space 103*b*, and the rear side may be defined as the opposite direction.

Figure 8:
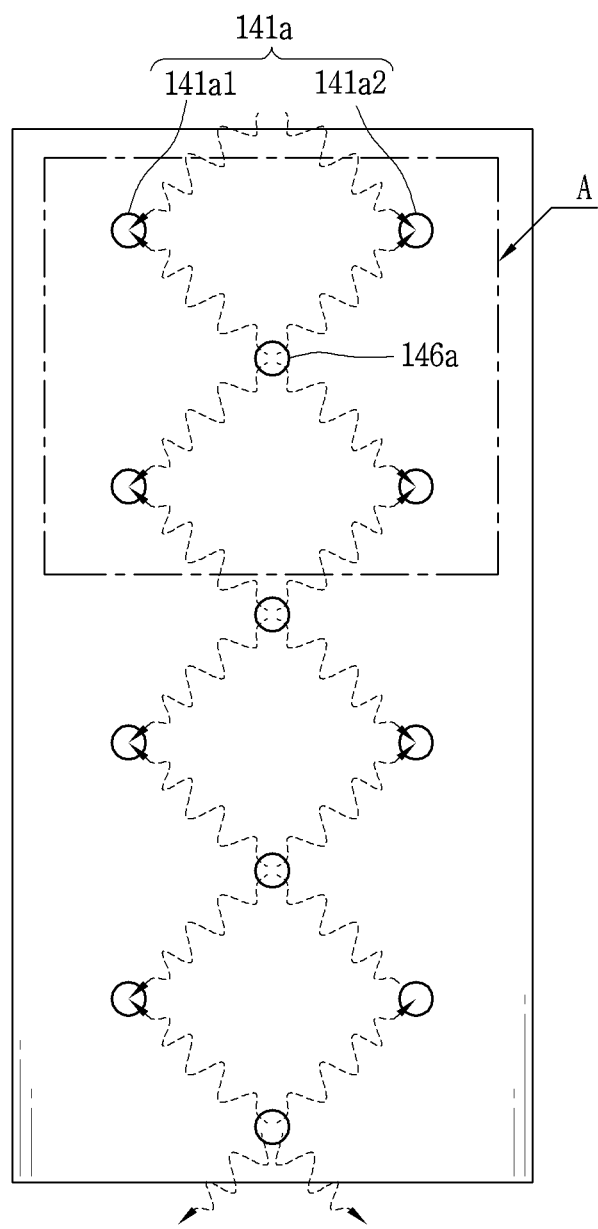
FIG. 8 is a schematic diagram deployed from the front to describe the locations of the first gas hole and the second gas hole according to this embodiment.
Figure 9:
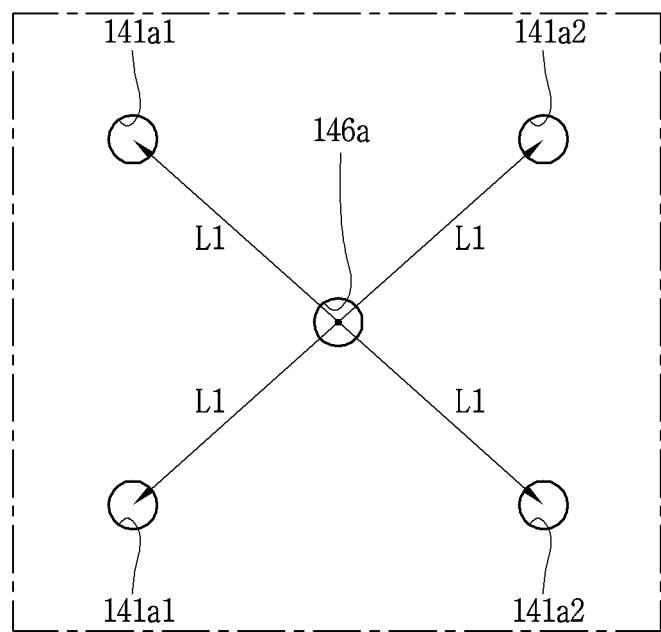
FIG. 9 is an enlarged schematic diagram of a portion of FIG. 8.

FIG. 8 is a schematic diagram deployed from the front to describe the locations of the first gas hole and the second gas hole according to this embodiment, and FIG. 9 is an enlarged schematic diagram of a portion of FIG. 8.

As shown in the drawings, the first gas holes 141*a* are located at front and rear sides with respect to one second gas hole 146*a*, and the second gas holes 146*a* are located in the middle among the first gas holes 141*a* in the lengthwise direction of the cylinder 141.

Here, the first gas holes 141*a* and the second gas hole 146*a* may be collinear in the lengthwise direction of the cylinder 141. However, in this case, the distance between the first gas hole 141*a* and the second gas hole 146*a* is narrowed. Accordingly, referring to the positional relationship between the first gas hole and the second gas hole shown in FIGS. 6 and 7, this is the same as described in FIG. 8.

That is, first gas holes located at the front side (hereinafter referred to as first front gas holes 141*a*1) and first gas holes located at the rear side (hereinafter referred to as first rear gas holes 141*a*2) are collinear in the lengthwise direction of the cylinder 141. Also, second gas holes 146*a* are located between the first front gas holes 141*a*1 and the second rear gas holes 141*a*2. Thus, the number of second gas holes 146*a* is smaller than the number of first gas holes 141*a*.

In a configuration in which the second gas holes 146*a* are occupied in common, the first front gas holes 141*a* 1 and the first rear gas holes 141*a* 2 are arranged in a zigzag shape In this case, as shown in FIG. 9, one second gas hole 146*a* is located in the center of four first gas holes 141*a* located in the vicinity, and the first gas holes 141*a* are located at the same distance L1 or approximately similar distances from the second gas hole 146*a*.

Thus, the pressure of the refrigerant flowing into the first gas hole 141*a* through the second gas hole 146*a* may be uniformly maintained, which may be slightly different depending on an arrangement of micropores 145*a* formed on the porous filter membrane 145.

A process of supplying refrigerant in the discharge space to the bearing surface between the cylinder and the piston in the linear compressor according to this embodiment is as follows.

Referring to FIGS. 3 and 9, the refrigerant discharged from the compression space flows into the second gas hole 146*a* through the bearing entrance recess 125*a*, the bearing communication hole 125*b*, and the bearing communication recess 125*c* constituting the refrigerant passage in the second discharge space 104*b*. In this case, since the bearing communication recess 125*c* is formed in an annular shape on the inner circumferential surface of the frame 120, the refrigerant circumferentially moves along the bearing communication recess 125*c*.

This refrigerant flows into the second gas hole 146*a* communicating with the bearing communication recess 125*c*, and the refrigerant flowing into the second gas hole 146*a* flows into the first gas hole 141*a* of the cylinder 141 through the micropores 145*a* of the porous filter membrane 145. Also, the refrigerant flowing into the first gas hole 141*a* flows to the bearing surface between the cylinder 141 and the piston 142 to lubricate the space between the cylinder 141 and the piston 142.

In this case, while passing through the micropores 145a of the porous filter membrane 145, the refrigerant passing through the porous filter membrane 145 is filtered to remove foreign substances and is decompressed to an appropriate pressure. Accordingly, the pressure of the refrigerant flowing to the bearing surface between the cylinder 141 and the piston 142 is not excessively higher than the pressure of the compression space 103b. Therefore, it is possible to suppress the refrigerant on the bearing surface from flowing into the compression space and also to suppress the refrigerant from leaking into the inner space 101 of the casing, which is a suction space.

Also, the refrigerant passing through the porous filter membrane 145 flows in through the second gas hole 146a and flows out of the first gas hole 141a, and thus a path of the micropores 145a in the porous filter membrane 145 is elongated. Thus, a sufficient pressure drop may be generated as the refrigerant stays in the porous filter membrane 145 for a long time. Therefore, even though the inner diameter D1 of the first gas hole 141a increases, the flow rate of the refrigerant supplied to the bearing surface may be appropriately maintained.

Also, the refrigerant flowing into the bearing communication recess 125c of the frame 120 is blocked by the shrink tube 146 not to directly flow to the porous filter membrane 145 but to flow to the porous filter membrane 145 through the second gas hole 146a provided in the shrink tube 146. Also, since distances between the second gas hole 146a and the first gas holes 141a are substantially the same, the pressure of the refrigerant flowing to the bearing surface between the cylinder 141 and the piston 142 may also be substantially uniform. Thus, Accordingly, the load-bearing capacity of the refrigerant with respect to the piston 142 may be uniformly formed because the pressure of the refrigerant is uniformly formed between the cylinder and the piston. This can effectively suppress abrasion or friction loss between the cylinder 141 and the piston 142.

The number of rows of the first gas holes 141a (for convenience, the longitudinal direction in the drawing is defined as a row) may be the same as the number of rows of the second gas holes 146a. In this case, preferably, the first gas holes 141a and the second gas hole 146a may be spaced at predetermined intervals from one another in the lengthwise direction or the circumferential direction of the cylinder 141.

For example, when the number of rows of the first gas holes 141a and the number of rows of the second gas holes 146a are all one and the first gas holes 141a and the second gas holes 146a are radially collinear, a path through which the refrigerant moves in the porous filter membrane 145 may be shortened. Then, the decompression effect of the refrigerant may be halved, thus increasing refrigerant consumption.

Figure 10:
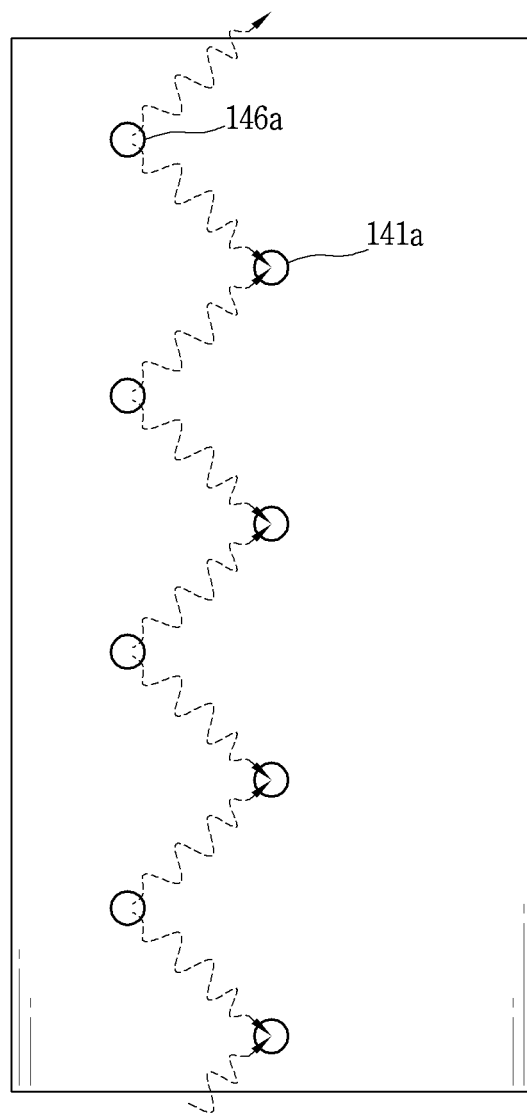
FIGS. 10 and 11 are schematic diagrams of other embodiments of arrangements of first gas holes and second gas holes according to the present invention.
Figure 11:
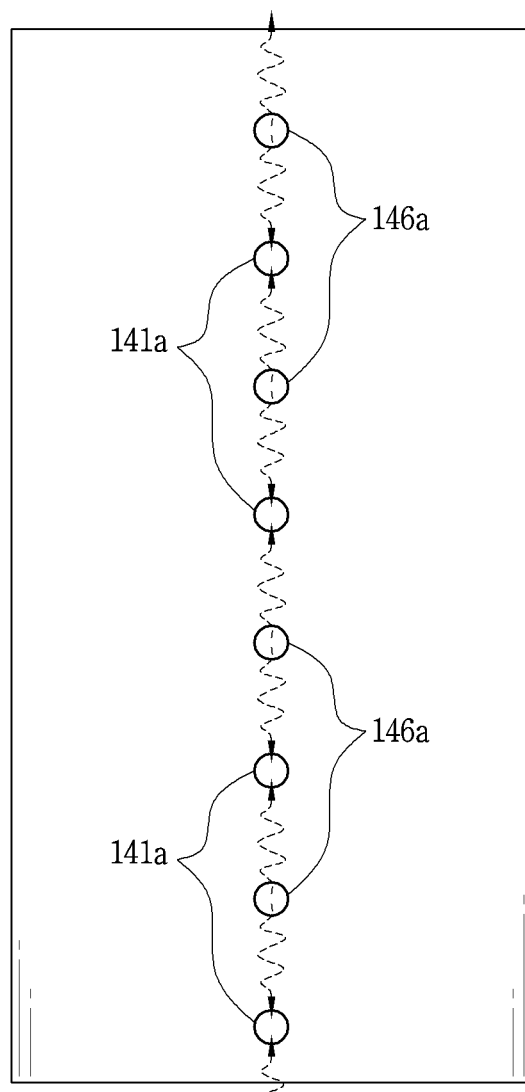

Accordingly, when the number of rows of the first gas holes 141a is the same as the number of rows of the second gas holes 146a, it is preferable that the first gas holes 141a and the second gas holes 146a are lengthwise and circumferentially spaced at predetermined intervals from one another as shown in FIG. 10 or that the first gas holes 141a and the second gas holes 146a are in the same lengthwise direction but are circumferentially spaced at predetermined intervals from one another as shown in FIG. 11, in order to elongate the refrigerant traveling path.

Also, in these cases, it is preferable that the first gas hole 141a communicating with the bearing surface be located at the center of the cylinder 141 because the distribution of the refrigerant on the bearing surface can be made uniform The arrangement of the first gas holes and the second gas holes may be variously configured in addition to the embodiments described above.

What is claimed is:

1. A linear compressor comprising:
    a linear motor that comprises a stator and a mover configured to reciprocate with respect to the stator;
    a piston coupled to the mover and configured to move based on reciprocation of the mover;
    a cylinder that accommodates the piston and that defines a compression space together with the piston, the cylinder defining at least one first hole that extends from an inner circumferential surface of the cylinder to an outer circumferential surface of the cylinder and that is configured to guide refrigerant discharged from the compression space to a bearing surface defined between the inner circumferential surface of the cylinder and an outer surface of the piston;
    a porous member located at the outer circumferential surface of the cylinder and configured to cover the at least one first hole, the porous member defining micropores having a diameter smaller than a diameter of the at least one first hole;
    a cover member that has a cylindrical shape surrounding the porous member and that is located at an outer circumferential surface of the porous member, the cover member defining a plurality of second holes that are in communication with the micropores of the porous member and extend from an outer circumferential surface of the cover member to an inner circumferential surface of the cover member; and
    a frame that surrounds the cover member and is located at the outer circumferential surface of the cover member, the frame defining a bearing communication hole configured to guide the refrigerant discharged from the compression space to the plurality of second holes of the cover member,
    wherein the plurality of second holes are arranged in a circumferential direction of the cover member and configured to supply the refrigerant into the at least one first hole through the micropores of the porous member.

2. The linear compressor of claim 1, wherein a diameter of one of the plurality of second holes is greater than the diameter of the micropores.

3. The linear compressor of claim 1, further comprising:
    a sealing member located at each of a first end of the porous member and a second end of the porous member.

4. The linear compressor of claim 3, wherein the cover member surrounds the sealing member and is configured to restrict movement of the sealing member.

5. The linear compressor of claim 4, wherein the cylinder defines an annular recess configured to receive the sealing member and to restrict movement of the sealing member in the annular recess.

6. The linear compressor of claim 1, wherein the inner circumferential surface of the cover member is in contact with the outer circumferential surface of the porous member, and
    wherein the outer circumferential surface of the cover member is in contact with an inner circumferential surface of the frame.

7. The linear compressor of claim 1, wherein the piston is configured to move between a front side of the cylinder and a rear side of the cylinder opposite to the front side, a volume of the compression space decreasing based on the piston moving from the rear side toward the front side, wherein the at least one first hole comprises a plurality of first holes, the plurality of first holes comprising a plurality of front holes defined at the front side of the cylinder and a plurality of rear holes defined at the rear side of the cylinder, and wherein at least one of the plurality of second holes is located at a position between the plurality of first holes.

8. The linear compressor of claim 7, wherein:

the plurality of front holes are arranged along a lengthwise direction of the cylinder, the plurality of rear holes are arranged along the lengthwise direction of the cylinder, and the at least one of the plurality of second holes is located at a position circumferentially between the plurality of front holes and circumferentially between the plurality of rear holes.

9. The linear compressor of claim 8, wherein the at least one of the plurality of second holes is located at a position spaced apart by a same distance from each hole of the plurality of first holes.

10. A linear compressor comprising:

a casing;

a linear motor located in an inner space of the casing, the linear motor comprising a stator and a mover configured to reciprocate with respect to the stator;

a cylinder that is located inside the linear motor and that defines a compression space, the cylinder defining a first hole that extends from an outer circumferential surface of the cylinder to an inner circumferential surface of the cylinder;

a piston located inside the cylinder and configured to reciprocate relative to the cylinder based on movement of the mover, the piston being configured to compress refrigerant in the compression space;

a discharge valve configured to open and close at least a portion of the compression space;

a discharge cover that accommodates the discharge valve, the discharge cover defining a discharge space configured to receive refrigerant discharged from the compression space;

a frame located in the inner space of the casing and configured to support the cylinder;

a porous filter membrane that is located between the outer circumferential surface of the cylinder and an inner circumferential surface of the frame, the porous filter membrane defining micropores having a diameter smaller than a first diameter of the first hole;

a sealing member located at one of two lengthwise sides of the porous filter membrane; and a shrink tube that surrounds the porous filter membrane and that is located at an outer circumferential surface of the porous filter membrane, the shrink tube defining a second hole having a second diameter larger than the diameter of the micropores, wherein the frame defines a refrigerant passage that allows communication between the discharge space and the second hole and that is configured to guide the refrigerant discharged from the compression space to the second hole of the shrink tube.

11. The linear compressor of claim 10, wherein the first hole comprises a plurality of first holes that are arranged along a lengthwise direction of the cylinder, wherein the second hole is located between the plurality of first holes in the lengthwise direction of the cylinder, and wherein the plurality of first holes are arranged about the second hole.

12. The linear compressor of claim 11, wherein each of the plurality of first holes is located at a position spaced apart by a same distance from the second hole.

13. The linear compressor of claim 10, wherein the shrink tube surrounds the sealing member.

14. The linear compressor of claim 10, wherein the outer circumferential surface of the porous filter membrane is in contact with an inner circumferential surface of the shrink tube, and wherein the inner circumferential surface of the frame is in contact with an outer circumferential surface of the shrink tube.

15. The linear compressor of claim 1, wherein an end of the bearing communication hole is connected to and in fluid communication with the plurality of second holes of the cover member.

16. The linear compressor of claim 10, further comprising an additional sealing member located at the other of the two lengthwise sides of the porous filter membrane.

17. The linear compressor of claim 16, wherein the shrink tube surrounds the sealing member and the additional sealing member.

18. The linear compressor of claim 1, wherein the plurality of second holes are spaced apart from one another in the circumferential direction of the cover member, and wherein the at least one first hole is located between two second holes among the plurality of second holes in the circumferential direction of the cover member.

19. The linear compressor of claim 1, wherein the at least one first hole comprises:

a plurality of front holes defined at a front side of the cylinder and arranged along a first circumference of the cylinder; and a plurality of rear holes defined at a rear side of the cylinder and arranged along a second circumference of the cylinder, the second circumference being axially spaced apart from the first circumference, and wherein the plurality of second holes are arranged along a circumference of the cover member positioned between the first circumference and the second circumference of the cylinder.

20. The linear compressor of claim 19, wherein one of the plurality of second holes is configured to supply the refrigerant to the plurality of front holes and the plurality of rear holes through the micropores of the porous member.

* * * * *